(12) United States Patent
Bianchi et al.

(10) Patent No.: US 11,122,927 B2
(45) Date of Patent: Sep. 21, 2021

(54) MACHINE FOR PREPARING A BEVERAGE WITH REPEATABLE CHARACTERISTICS

(71) Applicant: La Marzocco S.r.l., Scarperia (IT)

(72) Inventors: Roberto Bianchi, Scarperia (IT); Scott Guglielmino, Scarperia (IT); Riccardo Gatti, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 521 days.

(21) Appl. No.: 15/555,969

(22) PCT Filed: Mar. 16, 2015

(86) PCT No.: PCT/IB2015/051903
§ 371 (c)(1),
(2) Date: Sep. 5, 2017

(87) PCT Pub. No.: WO2016/147026
PCT Pub. Date: Sep. 22, 2016

(65) Prior Publication Data
US 2018/0055275 A1 Mar. 1, 2018

(51) Int. Cl.
*A47J 31/44* (2006.01)
*A47J 31/52* (2006.01)
*A47J 31/42* (2006.01)
*A47J 42/40* (2006.01)

(52) U.S. Cl.
CPC .......... *A47J 31/4403* (2013.01); *A47J 31/42* (2013.01); *A47J 31/52* (2013.01); *A47J 42/40* (2013.01)

(58) Field of Classification Search
CPC ......... A47J 31/4403; A47J 42/40; A47J 31/42
USPC ................................. 99/275, 280, 283, 285
See application file for complete search history.

(56) References Cited

U.S. PATENT DOCUMENTS 6,067,894 A * 5/2000 Eugster ................. A47J 31/404
99/280
6,550,370 B2 * 4/2003 Dam .................... A47J 31/0573
99/280
(Continued)

FOREIGN PATENT DOCUMENTS

EP 2 701 563 B1 6/2015
WO 2012138327 A1 10/2012
(Continued)

OTHER PUBLICATIONS

Balke, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
(Continued)

*Primary Examiner* — Thien S Tran
(74) *Attorney, Agent, or Firm* — Nixon & Vanderhye P.C.

(57) ABSTRACT

A machine for preparing and dispensing espresso coffee or the like is described, said machine comprising: a first device for measuring the mass of an amount of ground coffee to be used for preparing an espresso coffee, a second device for measuring the mass of the brewed espresso coffee, a processing device for calculating a degree of concentration corresponding to a ratio between said mass of the amount of ground coffee and said mass of the brewed espresso coffee.

19 Claims, 5 Drawing Sheets

(56) References Cited

U.S. PATENT DOCUMENTS

| | | | |
|---|---|---|---|
| 2007/0193452 A1 | 8/2007 | Campetella et al. | |
| 2009/0095165 A1* | 4/2009 | Nosier | A47J 31/007 99/289 R |
| 2011/0117259 A1* | 5/2011 | Storek | A47J 36/14 426/509 |
| 2016/0249763 A1* | 9/2016 | Llopis | A47J 31/3671 426/231 |
| 2017/0119195 A1* | 5/2017 | Al-Shaibani | A47J 31/52 |

FOREIGN PATENT DOCUMENTS

| | | |
|---|---|---|
| WO | 2012146641 A1 | 11/2012 |
| WO | 2015006244 A1 | 1/2015 |
| WO | 2015055342 A1 | 4/2015 |
| WO | WO-2015055342 A1 * | 4/2015 |

OTHER PUBLICATIONS

International Search Report and Written Opinion dated Jun. 15, 2015, issued in corresponding International Application No. PCT/IB2015/051903, filed Mar. 16, 2015, 10 pages.

Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.

* cited by examiner

MACHINE FOR PREPARING A BEVERAGE WITH REPEATABLE CHARACTERISTICS

The present invention relates in general to the sector of machines for preparing beverages. More particularly, it relates to a machine able to dispense espresso coffee with a same characteristic property, typically a desired degree of concentration.

Many machines for preparing beverages are known. In particular many machines for preparing espresso coffee from coffee powder, pods, capsules or the like are known.

Typically, in a machine for preparing coffee, a puck of ground coffee is passed through by a stream of water, at a certain pressure and a certain temperature. In some known machines it is possible to adjust precisely the pressure and/or the temperature of the water which passes through the puck of coffee. In some known machines, it is possible to modify the pressure and/or the temperature of the water during dispensing. All of the aforementioned features have been adopted by some coffee machine manufacturers in order to improve the quality of the beverage, attempting to extract from the ground coffee the substances and the essences in the best possible manner. The aforementioned features, along with other features, have also been employed in order to compensate, for example, for different coffee mixtures, different processing, different particle sizes, different degrees of compactness of the ground coffee and different percentages of moisture.

In some cases, the manufacturers of coffee machines have also attempted to find solutions which could result in the preparation of coffee with the same characteristics. For example, EP 2,701,563 describes a weighing device for an espresso coffee machine. The device comprises a weighing platform which can be positioned in the drip area of the machine, underneath its dispensing unit, a control unit connected to the weighing platform, a start/stop pushbutton, a timer unit and a display, all connected to the control unit in such a way that, during use, the weight of a dose of coffee is measured by the weighing platform and the time taken to dispense it is measured by the timer unit, and in such a way that the result is displayed on the display.

The solution according to EP 2,701,563 is very efficient and is able to obtain a dose of espresso coffee having a mass corresponding (less the tolerance of the measuring instruments) to a set mass. Therefore, by setting a certain desired mass, the machine prepares a certain dose of espresso coffee and stops once the desired mass has been reached. The mass of espresso coffee is measured immediately underneath the dispensing unit.

It is known that, in order to ensure a repeatability of the characteristics of the beverage, it is necessary to have a repeatability of the flow understood as being the ratio between the mass of beverage dispensed and the time taken for dispensing of said beverage.

The Applicant has noted that control of mass of the espresso coffee dispensed is important and allows cups of coffee containing a predetermined amount of espresso coffee to be obtained, but it is not sufficient to ensure that, over time, the beverage has the same characteristics. In fact, for example, for the same mass it may happen that a beverage which is very concentrated or less concentrated is obtained, depending also only on the degree of grinding of the coffee.

The Applicant has noticed that a characteristic which characterizes espresso coffee is the degree of concentration of the beverage.

The predefined object of the Applicant is to provide a machine able to dispense espresso coffee with a desired concentration which may be also optionally set by an operator. By controlling the concentration of the espresso coffee dispensed, the machine is able to prepare espresso coffee with the characteristics desired by the consumer in a manner highly repeatable over time.

For the purpose of the present description and the accompanying claims, the expression "brew ratio" (i.e. degree of concentration, or degree of concentration of a beverage) or "brewing ratio" is understood as meaning the ratio between the mass of ground coffee used and the mass of the final beverage dispensed.

For the purpose of the present description and the accompanying claims, two beverages have the same brew ratio when the aforementioned ratio is identical or differs by a percentage amount (in absolute terms) less than about 10%, preferably less than about 5% and even more preferably less than about 2-3%.

According to a first aspect, the present provides a machine for espresso coffee comprising: a first device for measuring the mass of an amount of ground coffee to be used for preparing an espresso coffee, a second device for measuring the mass of the brewed espresso coffee, a processing device for calculating a brew ratio corresponding to a ratio between said mass of the amount of ground coffee and said mass of the brewed espresso coffee. The machine may further comprise a device for notifying said calculated brew ratio to an operator.

Preferably the second device operates in a substantially continuous manner during dispensing of the espresso coffee.

Preferably the machine further comprises a memory for storing the value of one or more brew ratios.

The machine may also comprise a device for selecting one or more memorized brew ratio values.

The machine may further comprise a comparison device for comparing the value of current brew ratio with a value of memorized brew ratio and a stop device for stopping dispensing of the espresso coffee when the comparison device detects that the current value of brew ratio corresponds to a value of a desired stored brew ratio value.

The first weighing device may comprise a weighing device with load cells.

The second weighing device may comprise a weighing device with load cells.

In one embodiment the first device and the second device are a single device.

In one embodiment the first device for measuring the mass of an amount of ground coffee to be used comprises a code reader.

According to another aspect the present invention relates to a method for preparing and dispensing a beverage comprising: providing an amount of ground coffee powder; measuring the mass of the powder; starting the brewing of espresso coffee, selecting the value of the desired brew ratio; while the beverage is brewed, measuring the mass of the beverage and calculating the current brew ratio. The method could also comprise the step of notifying reaching of a predetermined brew ratio and/or stopping the brewing of the beverage upon reaching a predetermined brew ratio.

The step of measuring the mass of the powder may comprise identifying the filter and filter holder assembly and corresponding mass thereof and, subsequently, measuring the mass of the assembly comprising filter, filter holder and powder loaded in the filter.

The present invention will become clearer from the following description, provided by way of a non-limiting example, to be read with reference to the accompanying drawings, in which.

The description which follows is provided, solely for the sake of convenience, with reference in particular to a machine for espresso coffee, but the present invention is not limited to these machines and is applicable to machines for dispensing other beverages, typically prepared by means of infusion.

Since some components of the machine are substantially uninfluential for the purposes of the present invention, said machine will not be described in detail. In very general terms the machine to which the present invention is applicable comprises a pump for dispensing water under pressure from a water source (typically mains water) and a system for heating the water to a suitable temperature. As mentioned above, at present some known machines are provided with devices for adjusting parameters such as the water temperature and/or pressure, in some cases also during brewing of the beverage. All of this ensures that the beverage is extracted in the best possible manner from the ground coffee.

Typically, the ground coffee for preparing an espresso coffee is contained inside a substantially cup-shaped container with a bottom having suitably arranged holes of a certain shape and size. This container is referred to by the term "filter". A filter containing ground coffee which is pressed (manually or mechanically) is inserted inside a special cavity of a filter holder, typically provided with a one or two spouts and a lever, which is removably engaged (for example by means of bayonet-type connection) with a diffuser of a dispensing unit. Typically engagement is performed by rotating the filter holder in one direction. Disengagement, after dispensing of the coffee, is performed by rotating the filter holder in the opposite direction.

Each machine is typically provided with one, two or three dispensing units. A surface for supporting cups is present underneath the dispensing units. The support surface typically comprises a flat grille, underneath which a tray is arranged for collecting any coffee dripping from the filter holder, but not collected inside the cup, and/or the washing water of the dispensing units.

Each machine is typically provided with pushbuttons for performing switching-on and/or dispensing and optionally with devices for displaying dispensing parameters (for example, pressure and/or temperature).

Figure 1:
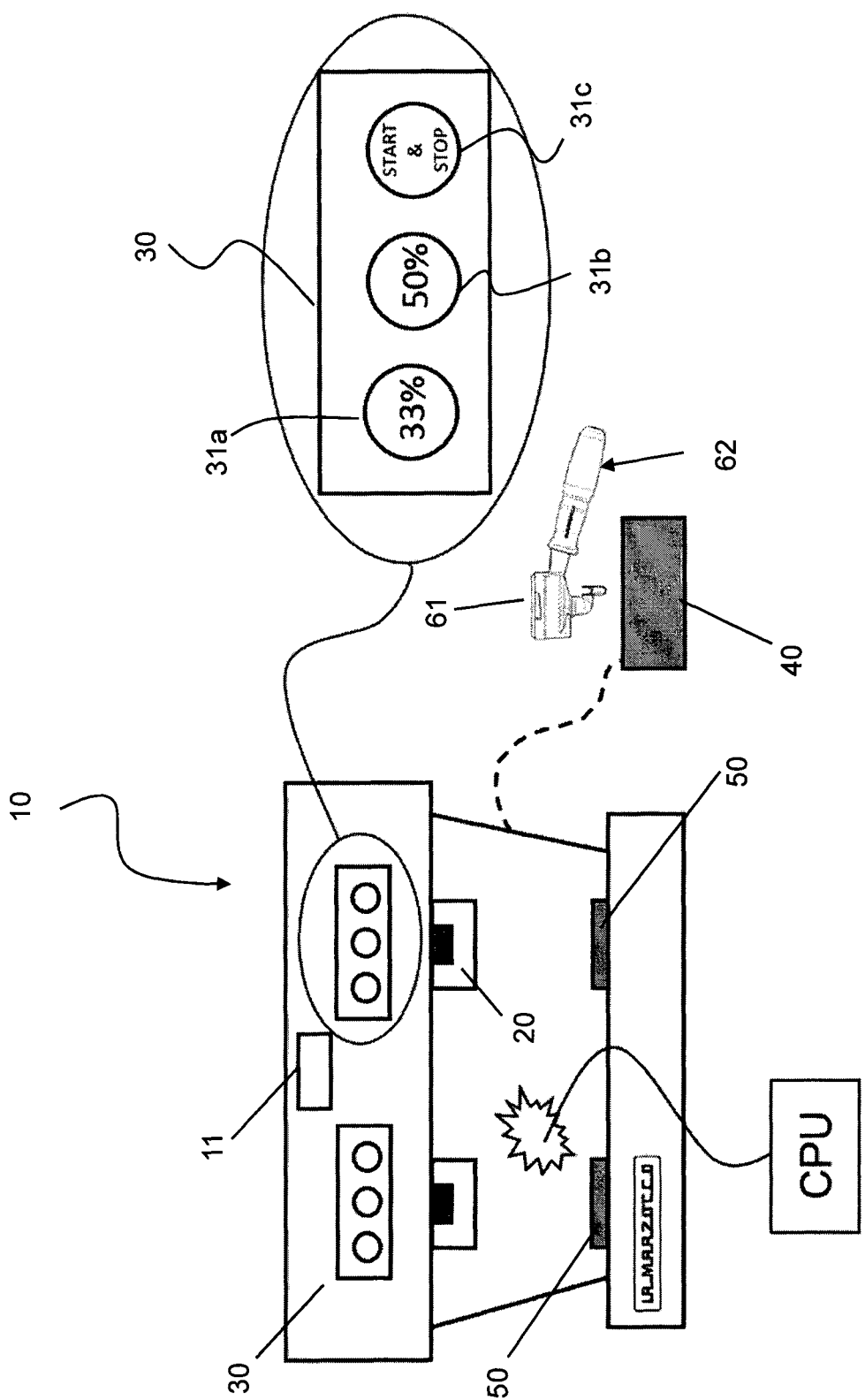
FIG. 1 shows in schematic form an espresso coffee machine according to an embodiment of the present invention.

Purely by way of example, the machine 10 shown in FIG. 1 comprises two dispensing units 20. However, the present invention is applicable to machines with a single dispensing unit or with more than two dispensing units.

The machine 10 according to the present invention is characterized in that it comprises means for calculating the brew ratio between the mass of an amount of ground coffee used to brew an espresso coffee and the mass of the espresso coffee actually brewed. As is known, consumers require espresso coffee in different amounts and/or with a different degree of dilution depending on their habits, personal tastes and/or the customary practices of the location where they are. Thus, a consumer may require a ristretto (short) coffee, a normal coffee, a long coffee, a caffé crema (cafe creme) or a "drip coffee" (filter coffee). The consumer may also require an espresso coffee which is single, double, triple, etc.

Table 1 shows, by way of example, a number of characteristics of some types of espresso coffee which are generally served in bars, coffee shops, or the like.

TABLE 1

| Type | No. of shots | Dry ground coffee [g] | | | Beverage [g] | | | Brew ratio % | | | Volume of froth incl. [ml] | |
|---|---|---|---|---|---|---|---|---|---|---|---|---|
| | | l | m | h | s | m | lar. | l | h | Type | l* | h** |
| Ristretto (short) | single | 6 | 7 | 8 | 4 | 7 | 13 | 60 | 140 | 100 | 9 | 17 |
| | double | 12 | 16 | 18 | 9 | 16 | 30 | | | | 20 | 38 |
| | triple | 19 | 21 | 23 | 14 | 21 | 38 | | | | 26 | 50 |
| Normal | single | 6 | 7 | 8 | 10 | 14 | 20 | 40 | 60 | 50 | 17 | 33 |
| | double | 12 | 16 | 18 | 20 | 32 | 45 | | | | 40 | 76 |
| | triple | 19 | 21 | 24 | 32 | 42 | 60 | | | | 56 | 99 |
| Long | single | 6 | 7 | 8 | 15 | 21 | 30 | 27 | 40 | 33 | 25 | 43 |
| | double | 12 | 16 | 18 | 30 | 48 | 67 | | | | 57 | 99 |
| | triple | 19 | 21 | 24 | 48 | 63 | 89 | | | | 74 | 130 |
| Caffé crema | single | 6 | 7 | 8 | 38 | 50 | 67 | 12 | 16 | 14 | 52 | 89 |
| | double | 12 | 16 | 18 | 75 | 114 | 150 | | | | 118 | 203 |
| | triple | 19 | 21 | 24 | 119 | 150 | 200 | | | | 155 | 266 |
| Drip coffee | SCAA standard | | 66 | | | 1000 | | 5 | 6 | 5.5 | | |

*volume of espresso coffee obtained with coffee beans (not fresh), filter holder with spouts; 100% *Arabica* mixture; lever-operated machine
**volume of espresso coffee obtained with fresh coffee beans, open filter holder; "strong" mixture, pump at about 9 bar pressure.
l = low;
m = medium;
h = high;
s = small;
lar. = large;
typ. = typical With reference therefore to the values shown in Table 1, the average mass of an amount of ground coffee used to prepare a normal single espresso coffee is about 7 g (the mass of ground coffee varies between 6 g and 8 g). A single normal espresso coffee served has an average mass of about 14 g (the mass varies between a minimum of 10 g and a maximum of 20 g). The relative brew ratio of the mass of the amount of ground coffee and single normal espresso coffee is, typically, 50% (varies between about 40% and about 60%).

As shown in Table 1, typically the aforementioned brew ratio is
about 100% (varies between about 60% and about 140%) for a ristretto (short) espresso coffee,
about 50% (varies between about 40% and about 60%) for a normal espresso coffee,
about 33% (varies between about 27% and 40%) for a long espresso coffee,
about 14% (varies between about 12% and about 16%) for a caffé crema and,
about 5.5% (varies between 5% and 6%) for a drip coffee.

Said means for calculating the brew ratio comprise a first weighing device 40 for measuring the mass of the ground coffee, a second weighing device 50 for measuring the mass of the brewed espresso coffee and a processing device (CPU) configured at least to receive the measured value of the ground coffee mass and the measured value of the mass of the brewed espresso coffee and obtain said brew ratio from the two measured mass values.

Figure 4:
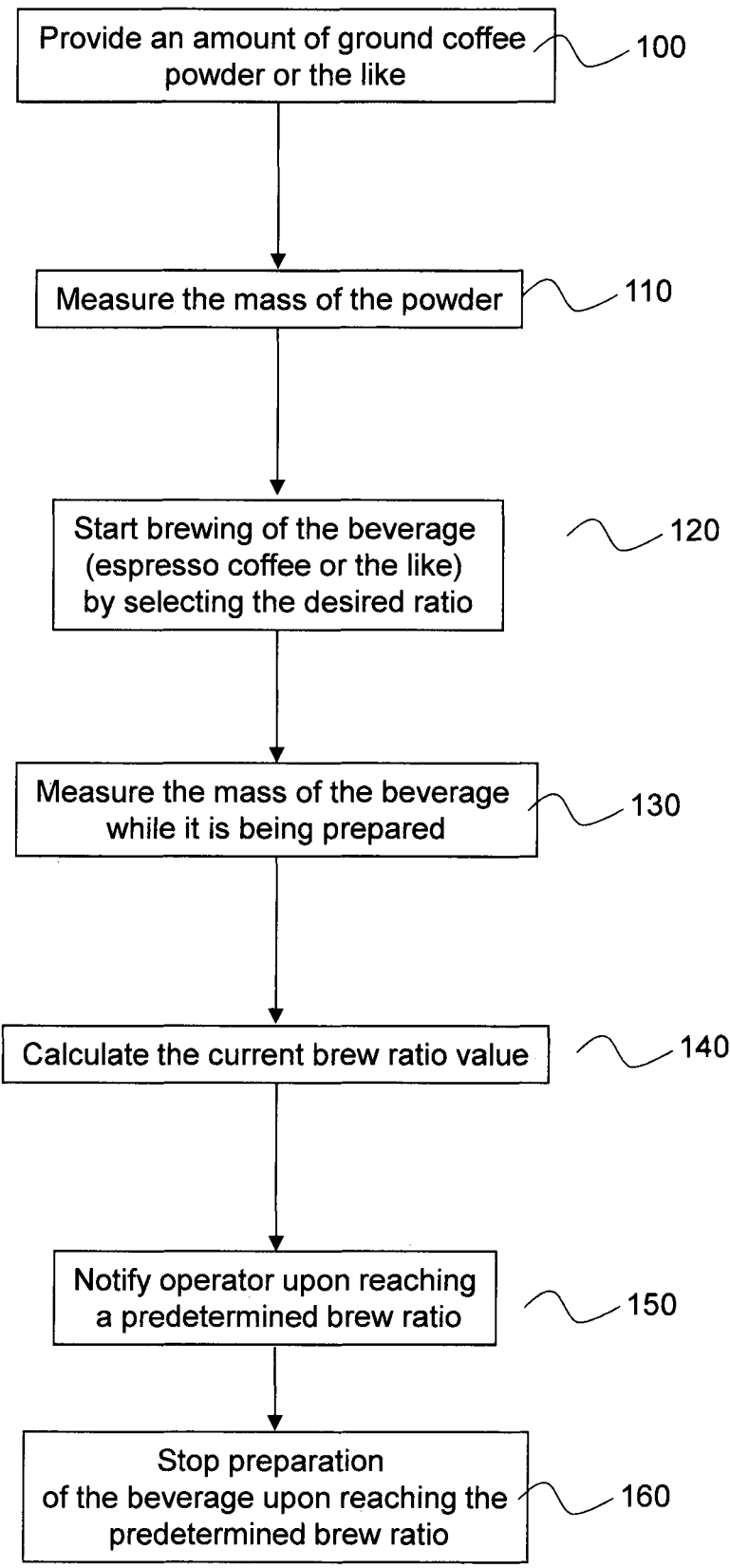
FIG. 4 is a flow diagram which schematically illustrates the operation of a machine according to an embodiment of the present invention.

FIG. 4 shows in schematic form the flow diagram for preparation of an espresso coffee according to the present invention.

The first step (100) is that of preparing an amount of ground coffee powder (or other substance, depending on the beverage which is to be obtained). The mass of powder is measured (110). Subsequently (120) the desired brew ratio value is selected and brewing of the espresso coffee (or other beverage) is started. While the beverage is being prepared, the mass of the said beverage (130) is measured and the current brew ratio (140) is calculated. Reaching of a predetermined brew ratio is notified (150). Preparation of the beverage is stopped (manually or automatically) when a predetermined brew ratio (160) is reached.

As already briefly mentioned above, the ground coffee is typically loaded into a filter 61, which is in turn placed inside the cavity of a filter holder 62. According to a first option, the mass of ground coffee may be measured before being loaded into the filter. Alternatively, according to a second option, the ground coffee mass may be measured after it has been loaded into the filter. Preferably, according to a third option, the mass of ground coffee may be measured after the filter (together with the ground coffee loaded inside it) has been placed inside the cavity of the filter holder.

The first weighing device 40 is preferably configured to measure the mass of ground coffee according to the third option. This also to achieve the aim of ensuring that the operations that the barman usually performs remain unchanged as far as possible. Therefore, preferably, the first weighing device 40 measures the mass of the assembly comprising ground coffee, filter and filter holder.

Figure 5:
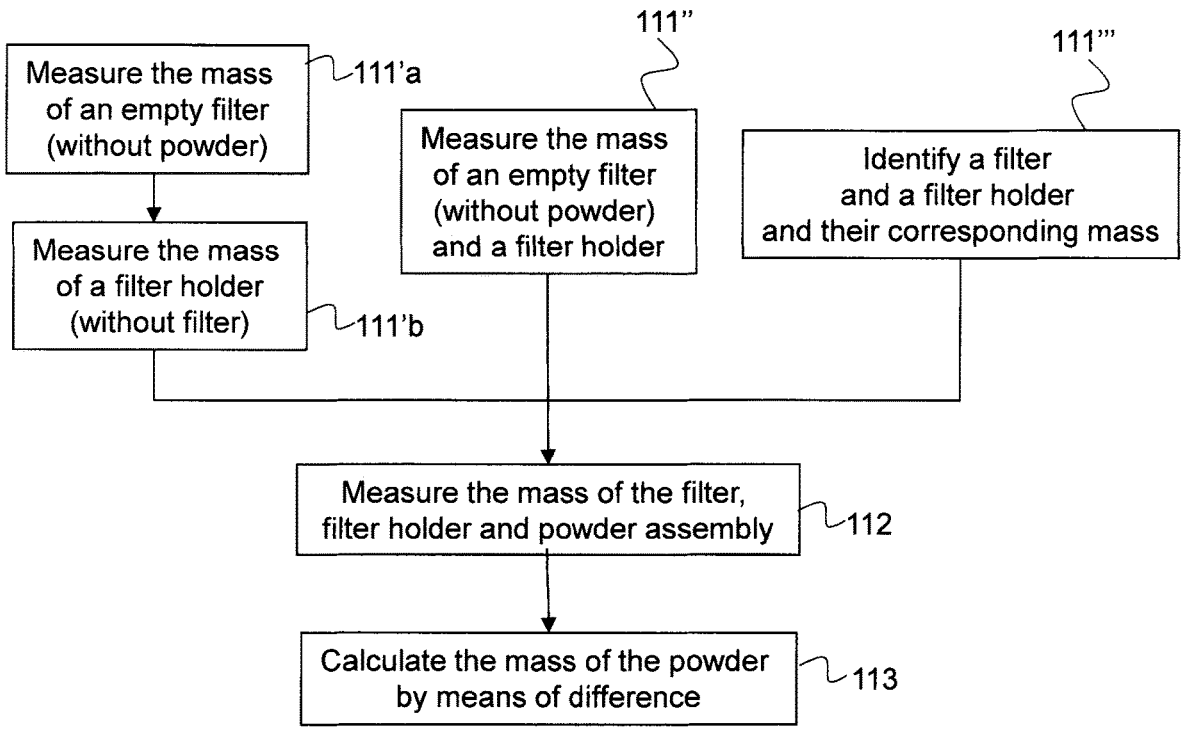
FIG. 5 is a flow diagram relating to calculation of the mass of the coffee powder.

The flow diagram in FIG. 5 shows, by way of example, a number of options for obtaining the mass value of the ground coffee. According to a first option, the mass of a filter empty, i.e. without powder (111'*a*), and the mass of a filter holder without filter (111'*b*) are measured separately. According to a second option, the overall mass of an empty filter and a filter holder (111") are measured. According to a third option, the filter and filter holder assembly and their corresponding mass (111''') are identified (manually, visually or automatically).

Subsequently (112) the mass of the assembly consisting of filter, filter holder and powder (loaded in the filter) is measured.

The mass of the ground coffee powder may be obtained by subtracting the mass of the filter 61 and the filter holder 62 from the overall mass 113.

However, it is possible for a barman to use, also during the course of the same working day, filters and/or filter holders made by different manufacturers and therefore shaped differently. Each filter and/or filter holder could have a different mass.

The mass of a plurality of different filters and filter holders (or of different filter and corresponding filter holder assemblies) could be measured by the barman or supplied by the manufacturer. The values could be shown in a table or in a list and, preferably, stored so that it can be selected by the barman. In any case, the barman must be able to determine the precise tare weight in order to obtain in a precise manner the powder mass.

Figure 2:
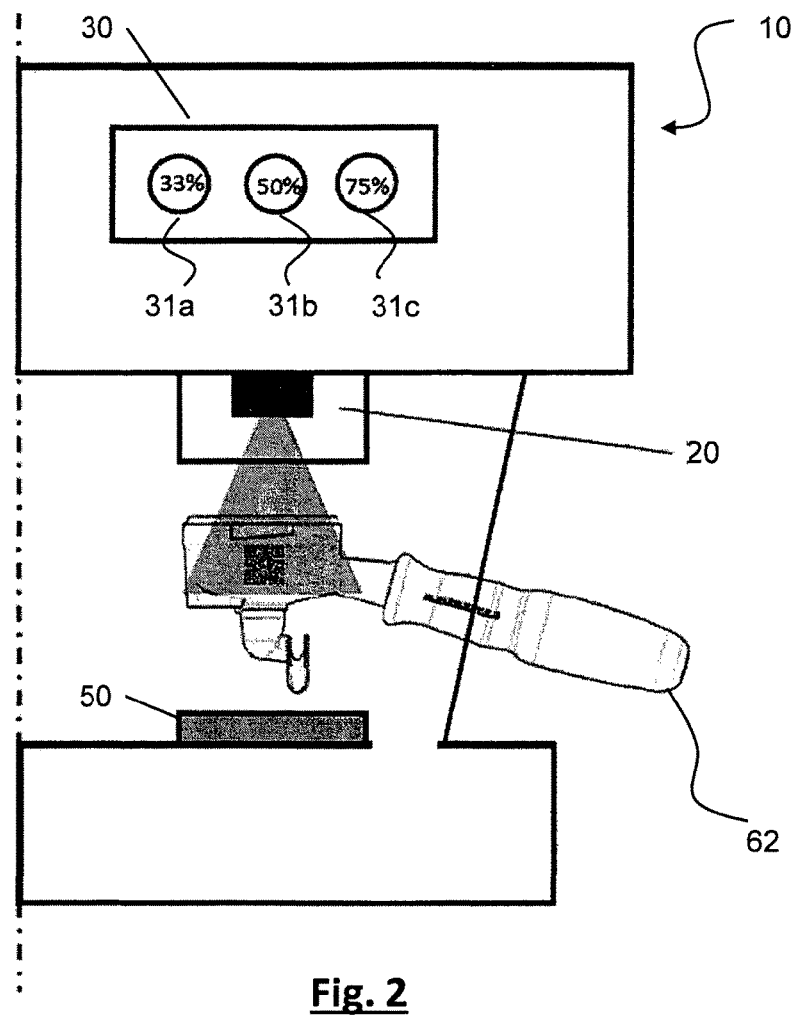
FIG. 2 shows, in schematic form, an advantageous feature which can be adopted in the machine according to FIG. 1.
Figure 3:
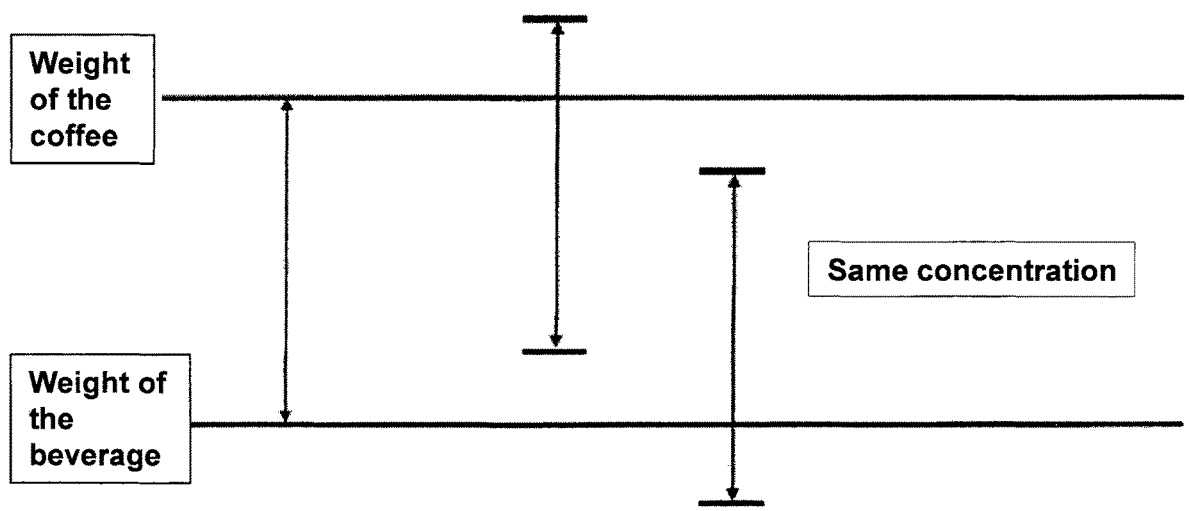
FIG. 3 is a schematic illustration of an example of a brew ratio example.

As mentioned above, some embodiments envisage a device for identifying each filter+filter holder assembly and associating with it a mass stored in a memory. Identification of the assembly may be performed by means of an optical reader which reads a symbol engraved, printed, applied or in any case impressed/fixed on the filter holder (or on any part of the assembly). The symbol may comprise one or more alphanumerical characters, a bar code, a QR code (or equivalent code) or an RFID (Radio-Frequency Identification) code. FIG. 2 illustrates recognition of the characteristics (for example mass) by means of a code reader.

The first weighing device 40 may be incorporated in the machine 10 or may be external thereto. The first weighing device may comprise digital load cells using load cells containing dedicated analog converters.

When incorporated in the machine, the first weighing device could be arranged underneath the coffee dispensing units, for example on the grille of the drip tray or in the vicinity thereof. The patent EP 2,701,563 describes a possible implementation of a weighing device in an espresso coffee machine or the like. The weighing device may comprise a weighing platform arranged inside a housing. The weighing platform can be preferably accessed through an opening in the top plate of the housing.

The second weighing device 50 is preferably arranged underneath the coffee dispensing units, on the grille of the drip tray. The patent EP 2,701,563, as already mentioned above, describes a possible implementation of a weighing device in an espresso coffee machine or the like.

Figure 6:
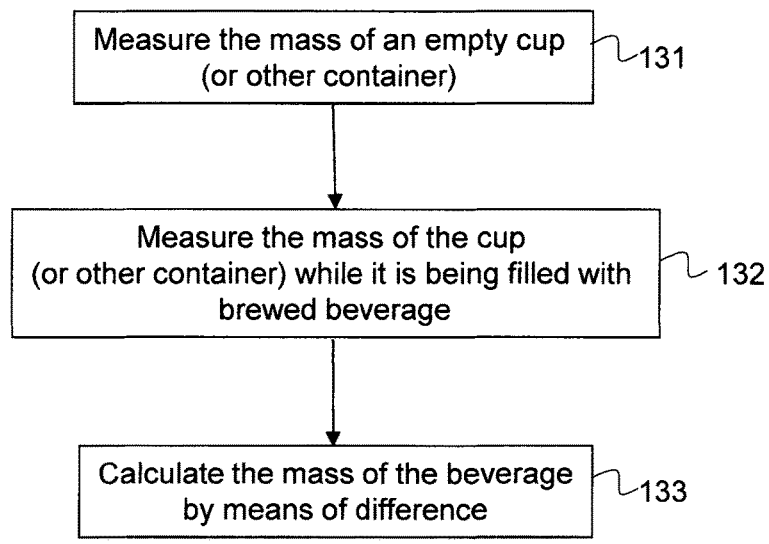
FIG. 6 is a flow diagram relating to calculation of the mass of the brewed beverage.

The second weighing device 50 preferably operates as illustrated in the flow diagram of FIG. 6. Initially (step 131) the mass of the cup (or other container) for holding the brewed beverage is measured. If the second weighing device is configured to detect the mass of an object placed on the grille of the drip tray, it is sufficient to place the empty cup on the grille. Alternatively, the mass of the cup could be stored in a machine memory and selected by the barman before starting dispensing of the beverage.

Once dispensing of the beverage has started, the second weighing device 50 measures the mass of the cup, while it is being filled with the brewed beverage. The mass of the brewed beverage is then calculated (for example by the CPU) in real time by subtracting the tare weight (mass of the cup) from the aforementioned measured value. Step 133 in FIG. 6.

At this point, from the measured mass values of the brewed beverage and the powder, the machine according to the present invention calculates the brew ratio, determining the relative ratio thereof.

The machine 10 according to the present invention may be configured to show, preferably in real time, the brew ratio value calculated. For example, a display 11 especially designed to display only the brew ratio value may be provided or the brew ratio value may be displayed on a display on which other values or information are also displayed.

Dispensing of the beverage may be stopped manually by the barman when a desired brew ratio value is reached or stopping of dispensing may be performed automatically when the set brew ratio value is reached.

Figure 7:
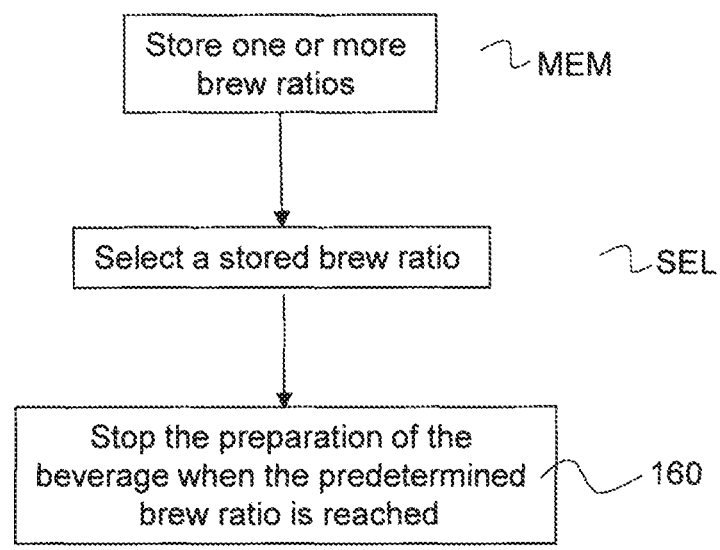
FIG. 7 is a flow diagram relating to operation of the expresso coffee machine shown in FIG. 1 based on a set brew ratio.
Figure 8:
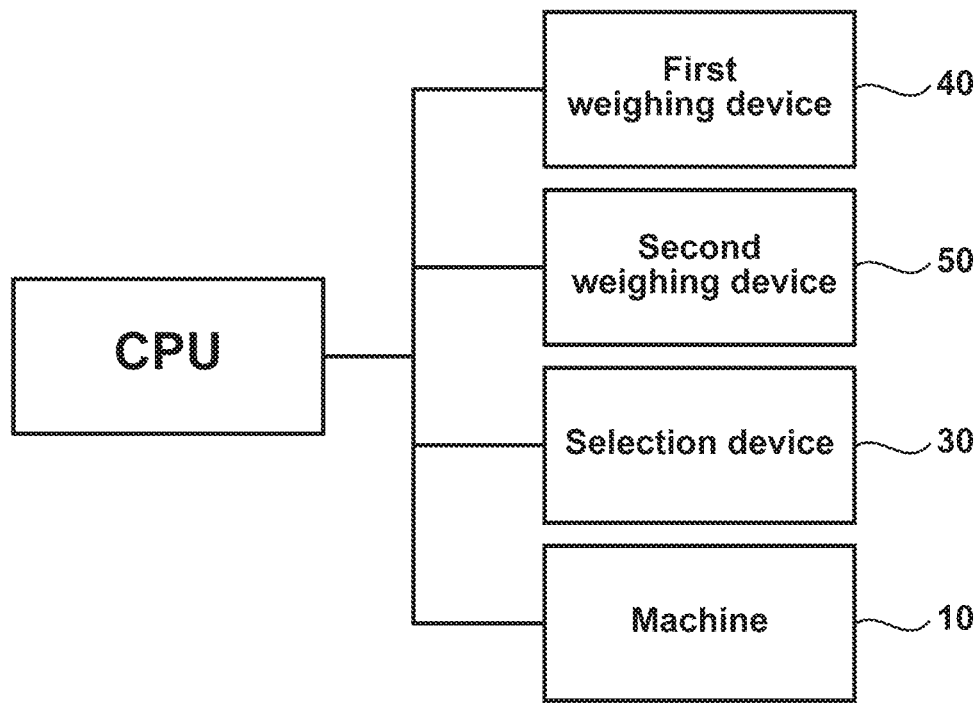
FIG. 8 is a connection diagram illustrating the connection of the processing unit (CPU) with other components of the espresso coffee machine shown in FIG. 1.

As shown in the flow diagram of FIG. 7, one or more brew ratio values may be stored (MEM). Memorization may be performed at the factory or may be performed by the barman, if necessary by importing data from an external memory device or manually setting the desired values.

Before starting dispensing of the beverage using a selection device 30, the barman may select (SEL) one of the brew ratio values stored or set a new one should a particular request be received from a client. FIGS. 1 and 2 show the machine 10 with three buttons 31a, 31b and 31c. The first button 31a may be pressed in order to select a brew ratio of 33% (for dispensing a long coffee), the second button 31b may be pressed to select a brew ratio of 50% (for dispensing a normal coffee) and the third button 31c may be pressed to select a brew ratio of 75% (for dispensing a ristretto (short) coffee). Each button may be a normal pushbutton, a keypad or a touch screen. As an alternative to the buttons with fixed values, a graduated bar could also be provided, said bar having a scale from 0% to 100% and for example a cursor so that the barman may set in a varying manner the desired brew ratio.

Dispensing of the beverage may then be automatically stopped (160, FIG. 7) when the set/selected brew ratio is reached.

FIG. 1 shows the buttons 31a, 31b and 31c which perform the manual start & stop function. Preferably, all the buttons 31a, 31b and 31c (including those which show in some form a brew ratio value) have the start & stop function associated with a programmed brew ratio value which may be modified.

According to the present invention, as mentioned above, the processing unit CPU may be preferably provided, said processing unit CPU being connected at least to the first weighing device 40, the second weighing device 50, the brew ratio selection device 30, and the electronics of the machine 10 for starting and stopping operation of the machine 10 in accordance with the procedure described above.

The first device for measuring the mass of an amount of ground coffee to be used for preparing an espresso coffee, the second device for measuring the mass of the brewed espresso coffee, the processing device for calculating the brew ratio corresponding to a ratio between said mass of the amount of ground coffee and said mass of the brewed espresso coffee and the device (display or the like) for notifying said calculated brew ratio to an operator may be all (or partly) incorporated in a coffee machine. Alternatively, all the aforementioned devices may be incorporated in a separate machine.

The invention claimed is:

1. A machine for preparing and dispensing espresso coffee, comprising:
a first weighing device for measuring a mass of an amount of ground coffee to be used for preparing an espresso coffee;
a second weighing device for measuring a mass of brewed espresso coffee dispensed using the amount of ground coffee; and
a processing device for calculating in real time, for each brewed espresso coffee, a brew ratio corresponding to a ratio between said mass of the amount of ground coffee as measured by the first weighing device and said mass of the brewed espresso coffee as measured by the second weighing device, and further comprising a memory for storing a value of one or more brew ratios.

2. The machine according to claim 1, further comprising a device for notifying said calculated brew ratio to an operator.

3. The machine according to claim 1, wherein said second weighing device operates in a continuous manner during dispensing of espresso coffee, so that, while an espresso coffee is prepared, the mass of the beverage is measured and the value of the current brew ratio is calculated.

4. The machine according to claim 3, further comprising a selection device for selecting one or more of the stored brew ratios.

5. The machine according to claim 4, wherein the processing device is configured to calculate a current brew ratio based on real time data from the second weighing device, and to compare the current brew ratio with a brew ratio selected using the selection device, and to stop the dispensing of espresso coffee when the current brew ratio corresponds to the selected brew ratio.

6. The machine according to claim 1, wherein the first weighing device comprises a weighing device with load cells.

7. The machine according to claim 1, wherein the second weighing device comprises a weighing device with load cells.

8. The machine according to claim 1, wherein the first weighing device and the second weighing device are a single device.

9. The machine according to claim 1, wherein the first weighing device for measuring the mass of an amount of ground coffee to be used comprises a code reader.

10. A method for preparing and dispensing an espresso coffee comprising:
measuring a mass of amount of ground coffee;
starting brewing of espresso coffee,
selecting a value of a desired brew ratio among one or more values of brew ratio stored in a memory; and
while each espresso coffee is being brewed, measuring the mass of the brewed espresso coffee and using a processor to calculate in real time a value of a current brew ratio between the measured mass of the amount of ground coffee and a measured mass of the brewed espresso coffee; and
notifying an operator upon reaching of a predetermined brew ratio between the measured mass of the amount of ground coffee and measured mass of the brewed espresso coffee.

11. The method of claim 10, further comprising notifying reaching of the predetermined brew ratio to an operator.

12. The method of claim 10, further comprising stopping brewing of the beverage upon reaching the predetermined brew ratio.

13. The method of claim 10, wherein the step of measuring the mass of the powder comprises, by a first device, identifying a filter and filter holder assembly and corresponding mass thereof and, subsequently, measuring mass of the assembly comprising filter, filter holder and coffee powder loaded in the filter.

14. The machine according to claim 1, further comprising a dispensing unit from which the mass of brewed espresso coffee is dispensed; and wherein the second weighing device is arranged underneath the dispending unit and is distinct from the first weighing device.

15. The method of claim 10, further comprising using the processor to control dispensing of the brewed espresso coffee in accordance with the brew ratio.

16. A machine for preparing and dispensing espresso coffee, comprising:
- a dispenser from which a mass of brewed espresso coffee is dispensed;
- a first weighing device configured to measure a mass of an amount of ground coffee to be used for preparing an espresso coffee;
- a second weighing device arranged underneath the dispenser and which is configured to determine the mass of the brewed espresso coffee dispensed from the dispenser;
- a processor configured to determine in real time, for each brewed espresso coffee, a brew ratio corresponding to a ratio between the mass of an amount of ground coffee as measured by the first weighing device to be used for preparing the espresso coffee and the mass of the brewed espresso coffee dispensed from the dispenser as measured by the second weighing device and for controlling dispensing of the brewed espresso coffee in accordance with the brew ratio; and
- a memory configured to store the value of one or more brew ratios.

17. The machine according to claim 16, wherein the processor is configured to stop brewing of the espresso coffee upon reaching a predefined brew ratio.

18. The machine according to claim 16, wherein the mass of the amount of ground coffee to be used for preparing the espresso coffee is determined from a measurement.

19. The machine according to claim 16, wherein the mass of the amount of ground coffee to be used for preparing the espresso coffee is determined by reading a mass-indicative code.

* * * * *